United States Patent
Given et al.

(10) Patent No.: US 8,431,178 B2
(45) Date of Patent: Apr. 30, 2013

(54) INCREASING THE CONCENTRATION OF TERPENE COMPOUNDS IN LIQUIDS

(75) Inventors: Peter Given, Ridgefield, CT (US); Colin Ringleib, Thornwood, NY (US)

(73) Assignee: PepsiCo, Inc., Purchase, NY (US)

( * ) Notice: Subject to any disclaimer, the term of this patent is extended or adjusted under 35 U.S.C. 154(b) by 190 days.

(21) Appl. No.: 12/879,334

(22) Filed: Sep. 10, 2010

(65) Prior Publication Data

US 2012/0064221 A1    Mar. 15, 2012

(51) Int. Cl.
*A23L 1/226*    (2006.01)

(52) U.S. Cl.
USPC .............. 426/650; 426/330.3; 426/330.4; 426/534; 426/590; 426/602; 426/616; 426/651

(58) Field of Classification Search ............. 426/330.3, 426/330.4, 534, 590, 602, 616, 650, 651
See application file for complete search history.

(56) References Cited

U.S. PATENT DOCUMENTS

| | | | |
|---|---|---|---|
| 4,835,002 A | 5/1989 | Wolf et al. | |
| 5,674,549 A | 10/1997 | Chmiel et al. | |
| 6,048,566 A | 4/2000 | Behnam et al. | |
| 6,251,441 B1 | 6/2001 | Van Den Braak et al. | |
| 6,444,253 B1 | 9/2002 | Conklin et al. | |
| 2003/0113277 A1* | 6/2003 | Santi et al. | 424/49 |
| 2003/0228395 A1 | 12/2003 | Garti et al. | |
| 2004/0086619 A1 | 5/2004 | Zhong et al. | |
| 2007/0087104 A1 | 4/2007 | Chanamai | |
| 2007/0104849 A1 | 5/2007 | McClements et al. | |
| 2007/0148309 A1 | 6/2007 | Behnam | |
| 2007/0161526 A1* | 7/2007 | Vlad et al. | 510/130 |
| 2007/0178206 A1 | 8/2007 | Zhong et al. | |
| 2008/0255247 A1 | 10/2008 | Sagalowicz et al. | |
| 2009/0196972 A1 | 8/2009 | Monsalve-Gonzalez et al. | |
| 2010/0323066 A1* | 12/2010 | Comstock | 426/72 |

FOREIGN PATENT DOCUMENTS

| | | |
|---|---|---|
| EP | 0 631 771 | 1/1995 |
| EP | 1 243 185 | 9/2002 |
| EP | 2 025 250 | 2/2009 |
| EP | 2 340 804 | 7/2011 |
| JP | 2006136230 | 6/2006 |
| KR | 100 677 949 | 2/2007 |
| WO | 20071026271 | 3/2007 |

OTHER PUBLICATIONS

Garti et al., "Improved Oil Solubilization in Oil/Water Food Grade Microemulsions in the Presence of Polyols and Ethanol," J. Agric. Food Chem., vol. 49, No. 5, 2001, pp. 2552-2562.
Chaipongrattana, "Development of a Grapefruit-Flavoured Spirit With the Opalescence Properties of Pastis," Auckland University of Technology, Jul. 2008.
Kogan et al., "Microemulsions As Transdermal Drug Delivery Vehicles," Advances in Colloid and Interface Science, vol. 123-126, 2006, pp. 369-385.
Rega et al., "Role of Pulp in Flavor Release and Sensory Perception in Orange Juice," J. Agric. Food Chem., vol. 52, No. 13, 2004, pp. 4204-4212.
International Search Report in related International Patent Application No. PCT/US2011/051059 dated Mar. 5, 2012.

* cited by examiner

*Primary Examiner* — Helen F Heggestad
(74) *Attorney, Agent, or Firm* — Banner & Witcoff Ltd.

(57) ABSTRACT

A method for increasing the concentration of solubilized terpene compounds in liquids is disclosed, as well as liquid, beverage or microemulsion compositions containing terpenes and more polar flavor compounds. The compositions include terpene compounds, which are useful flavoring agents, and the disclosed methods and compositions allow a suitable level of terpenes for flavoring purposes while providing haze- and cloud-free final beverages that do not form an undesirable separate oil phase.

20 Claims, No Drawings

INCREASING THE CONCENTRATION OF TERPENE COMPOUNDS IN LIQUIDS

FIELD OF THE INVENTION

The invention relates to increasing the concentration of terpene compounds in liquids. In particular, the invention relates to increasing the concentration of terpene compounds in beverages, especially in clear beverages, by using flavor compounds more polar than the terpene compounds to facilitate solubilization of the terpene compounds and provide a flavorful beverage. The invention also relates to a flavor composition comprising the more polar flavor compounds and terpene compounds and to beverage concentrates comprising the more polar flavor compounds and terpene.

BACKGROUND OF THE INVENTION

Consumers demand liquids, including beverages, that are flavorful and that match their expectations regarding appearance. For example, consumers typically expect a certain appearance for a soft drink—cola and root beer are expected to be brown, orange flavor typically requires an orange, opaque beverage, and lemon, lime, and lemon/lime beverages are transparent, indeed, typically, they are colorless. Consumers typically expect mouthwash to be transparent, whereas both transparent and cloudy sports beverages are considered acceptable. Tea drinks, whether dark or light in color, typically are expected to be transparent.

Consumers also demand beverages that provide health benefits. Thus, flavored and fortified waters, which often are expected to be transparent, are in demand. More importantly, the flavors of such beverages are expected to be fresh and faithfully to reproduce the expected flavor. Consumers also demand fidelity of flavor in soft drinks and other liquids.

Many flavors are used for such liquids. Typical flavors include fruit flavors, such as citrus flavors, berry flavors, and melon flavors. Other organic and botanical flavors also are popular. Such flavors include mint flavors and tea flavors.

Many flavoring compositions, both artificial and natural, have been developed to impart flavor to liquids. Typically, flavoring compositions comprise both water-soluble and water-insoluble compounds. The water-insoluble compounds in flavors typically make a significant contribution to the perception of flavor as a complete, true, faithful representation of the flavor. As the skilled practitioner recognizes, the water-insoluble compounds often introduce haze, cloud, precipitation, or a phase separation in aqueous liquids, or may form a ring on the beverage container. These phenomena may cause consumers not to accept the liquid because these phenomena often are taken as an indication that the liquid is unfit for consumption, or that the beverage has spoiled.

Therefore, attempts have been made to reduce haze and clouding. Removal of water-insoluble components from flavoring compositions, referred to as "extraction" or "washing" in the trade, typically provides an incomplete flavor. Thus, even though the liquid may not be hazed or cloudy, the product is rejected because the flavor does not mimic fruit flavor found in nature. For example, lemonade that does not contain an appropriate concentration of water-insoluble compounds tastes objectionably 'watered down,' or candy-like as compared to fresh squeezed fruit.

Therefore, there exists a need for a flavoring composition that provides a beverage that is both clear and full-flavored.

BRIEF SUMMARY OF THE INVENTION

A first embodiment of the invention is directed to increasing the concentration of terpene compounds in liquids. In particular, embodiments of the invention are directed to increasing the concentration of terpene compounds in beverages, especially clear, or transparent, beverages.

Additional embodiments of the invention are directed to increasing the concentration of terpene compounds in liquids by adding flavor compounds more polar than the terpene compounds to solubilize the terpene. In particular, embodiments of the invention are directed to liquids that are beverages, especially clear beverages, comprising a flavor compound that is more polar than the terpene compounds to solubilize the terpene compounds and provide a flavorful liquid. Still additional embodiments of the invention relate to beverage concentrates comprising the more polar flavor compounds and terpene.

Other embodiments of the invention relate to a precursor flavor composition comprising terpene compounds and flavor compounds more polar than the terpene compounds.

DETAILED DESCRIPTION OF THE INVENTION

Demand for full-flavored liquids, especially beverages, requires flavoring compositions that faithfully reproduce the intended flavor. However, it is difficult to produce in a liquid, especially a clear liquid, a full flavor that comprises terpene compounds. Because terpene compounds are only sparingly soluble in water, terpene compounds tend to haze or cloud a beverage, or to form a separate phase from aqueous solution, or to form a ring on the container. Thus, many flavor compositions contain only water-soluble compounds and little to no terpene compounds. Terpene compounds are important flavor components for many flavors, so such flavors deficient in terpene compounds do not satisfactorily reproduce the intended flavor.

The inventors have discovered that terpene compounds are solubilized by addition of flavor compounds more polar than the terpene compound. The inventors have discovered that solubilizing the terpene compounds enables a higher concentration of terpene compounds in aqueous solution. Therefore, transparent liquids can be made with a flavor that reproduces the intended flavor more faithfully than known flavor compositions that have lower concentrations of terpene compounds.

Embodiments of the invention are directed to increasing the concentration of terpene compounds in liquids. In particular, embodiments of the invention are directed to increasing the concentration of terpene compounds in liquid by solubilizing the terpene compounds with flavor compositions more polar than the terpene. Other embodiments of the invention are directed to producing full-flavored, transparent, haze- and cloud-free beverages that do not form an undesirable separate oil phase and do not form a ring on the container by solubilizing terpene compounds with flavor compositions more polar than the terpene compounds.

Still other embodiments of the invention are directed to flavor compositions comprising terpene compounds and flavor compounds more polar than the terpene. Still further embodiments of the invention are directed to beverage concentrates that comprise terpene compounds and flavor compounds more polar than the terpene compounds.

Further, embodiments of the invention have a higher concentration of terpene compounds at given surfactant concentration than compositions that do not have a sufficient concentration of more polar flavor compounds. The skilled practitioner recognizes that it is possible to increase the concentration of terpene compounds in a composition by increasing surfactant concentration. However, the skilled practitioner also recognizes high surfactant concentration may lead to beverage formulation difficulties, including adverse flavor effects, high cost, excessive foaming, and the possibility that regulatory limits would be exceeded at a surfactant concentration required to achieve the desired concentration of terpene compounds.

Liquid beverages that are embodiments of the invention are full-flavored because the concentration of terpene compounds is closer to the concentration of terpene compounds of the flavor essence, and are clear because the terpene compounds are solubilized by the more polar flavor compounds. Other embodiments of the invention are directed to full-flavored, clear, transparent liquids.

"Clear" refers to optical clarity, i.e., a clear beverage can be as clear as water. In a preferred embodiment of the present invention, the beverage concentrate and/or the finished beverage are clear as evidenced by a reading by a HACH Turbidimeter (Model 2100AN, Hach Company, Loveland, Colo.) of around 1 NTU (Nephelometric Turbidity Units) and not more than 3 NTU. When such a reading is as high as around 5 to 10 NTU, a sample is not clear, but rather slightly hazy or very slightly hazy. Thus, a beverage having turbidity not greater than about 3 NTU is said to be a clear beverage.

Non-limiting examples of liquids that may comprise terpene-containing flavor compositions include non-carbonated and carbonated beverages having citrus flavors such as lemon, lime, lemon/lime, orange, grapefruit, and other flavors; colas, ginger ales, root beers, ciders, other fruit-flavored soft drinks such as strawberry, melon, pomegranate, and the like, and drinks made by adding water to a powder or concentrate (e.g., cola, juice, tea, flavoring for water, coffee, and ades). Other examples include fruit juices of all types, including beverages and ades containing juice or fruit particles, such as lemonade, vegetable juices, and mixed juices containing fruits and vegetables. Additional examples include sport drinks, energy drinks, water with natural or artificial flavorants, tea and tea-containing beverages, coffee and coffee-containing beverages, and cocoa.

Dairy beverages that contain other components also are examples of beverages. Such beverages include milk, half and half, and cream, drinkable yogurt, lactic acid bacteria beverages, and beverages containing milk components such as coffee containing dairy components, cafe au lait, and tea with milk. Combination beverages, such as fruit milk beverages, smoothies, milk shakes, frappes, and malts, also often are flavored.

Beverage creamers also may be flavored. Such creamers may be dairy-based or non-dairy based, and are used to lighten beverages such as coffee and tea. Often, these creamers contain flavors, such as chocolate, mint, nut, orange, and vanilla, and sweeteners.

Aqueous solutions used to make beverages by addition of alcohol, or which already contain alcohol and so are 'ready-to-drink,' also may be flavored. The non-alcoholic solutions typically provide all ingredients necessary to make an alcoholic drink, such as a 'mojito,' a 'mai tai,' a 'margarita', whether flavored or unflavored, or a 'tom collins,' for example.

Frozen and cold confections, such as beverages that are made by mixing a sweetened liquid composition with or pouring a sweetened liquid composition over particulate ice, such as a 'snow cone,' or by dispensing a pressurized, carbonated sweetened liquid solution or a supercooled sweetened liquid solution to form a frozen confection, also are examples of flavored liquids. Frozen alcoholic beverages are made from flavored liquids.

Liquid pharmaceuticals and nutraceuticals also may be flavored. Vitamins, cough syrups, liquid amino acids, and bitter-tasting liquid medicines are exemplary. Mouth freshening agents, gargles, mouth rinsing agents, mouth sprays, liquid teeth-whitening agent, and dietary supplements are examples of personal care products that often are flavored.

Typically, embodiments of the invention relate to liquids that are transparent. Such liquids may have any color, but are not hazy or cloudy. However, embodiments of the invention can be used to improve the flavor of any liquid or beverage.

Embodiments of the invention include liquids that are sweetened, whether by natural or artificial (synthetic) sweeteners, or by standard potency or high-potency sweeteners. For example, a "natural high-potency sweetener" means any sweetener found in nature which may be in raw, extracted, purified, treated enzymatically, or any other form, singularly or in combination, and characteristically has a sweetness potency greater than sucrose, fructose, or glucose, yet has fewer calories. Non-limiting examples of natural high-potency sweetener include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, neoastilbin, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I. The rebaudiosides often are abbreviated 'Reb,' so, for example, rebaudioside A also is known as 'Reb A.' These terms are used interchangeably herein.

"Natural high-potency sweetener" also includes modified natural high-potency sweeteners, i.e., natural high-potency sweeteners that have been altered naturally. For example, a modified natural high-potency sweetener includes, but is not limited to, natural high-potency sweeteners that have been fermented, contacted with enzyme, or derivatized or substituted on the natural high-potency sweetener.

Artificial high potency sweeteners include, but are not limited to, sucralose, acesulfame potassium ("aceK") or other salts, aspartame, alitame, saccharin, neohesperidin dihydrochalcone, cyclamate, neotame, N—[N-[3-(3-hydroxy-4-methoxyphenyl)propyl]-L-alpha-aspartyl]-L-phenylalanine 1-methyl ester, N—[N-[3-(3-hydroxy-4-methoxyphenyl)-3-methylbutyl]-L-alpha-aspartyl]-L-phenylalanine 1-methyl ester, N—[N-[3-(3-methoxy-4-hydroxyphenyl)propyl]-L-alpha-aspartyl]-L-phenylalanine 1-methyl ester, and salts thereof.

Standard potency sweeteners include sugar alcohols, such as but not limited to, mannitol, sorbitol, erythritol, threitol, xylitol, and maltitol; monosaccharides and disaccharides including sucrose from any source, fructose, glucose, and dextrose. Standard potency sweeteners also include honey, molasses, sorghum, and other sweeteners known to skilled practitioners.

Embodiments of the invention include liquids and beverages having ingredients and made in any manner that does not preclude use of more polar flavor compounds to solubilize terpene compounds in the liquid or beverage. Typically, flavors are added toward the end of a manufacturing process, but can be added at any step in the process that does not interfere with maintaining the solubility of terpene compounds.

Liquid embodiments of the invention have a flavor more complete than the flavor of a liquid that includes terpene compounds at a concentration lower than the concentration that can be delivered by embodiments of the invention. Use of flavor compounds more polar than terpene compounds in a flavor essence to be solubilized provides a flavor more like the product from which the essence is derived than does known flavor essences, which typically contain only the water-soluble components.

In accordance with other embodiments of the invention, a liquid embodiment of the invention comprises a base flavor that does not typically contain terpene compounds, and solubilized terpene compounds are used to provide a new or more complex flavor by introducing terpene compounds that typically are not present in the base flavor. For example, a 'hint' of a flavor, such as lemon or other citrus by introduction of limonene, can be introduced to a base flavor, such as tea or cola, to produce a more complex flavor. Similarly, lemonade that is cloudy is more likely to have a flavor that is faithful to the expected lemon flavor because the concentration of terpene compounds is high. However, a clear lemonade having a comparable 'true-to-fruit' flavor can be made using embodiments of the invention to increase terpene (limonene) concentration without clouding the beverage. Clear citrus-flavored beverage having a true-fruit flavor also can be produced in accordance with embodiments of the invention.

As used herein, "terpene compounds" mean compounds selected from the group consisting of terpenes, sesquiterpenes, diterpenes, and higher-order terpenes, and blends thereof. As the skilled practitioner recognizes, terpene compounds are combinations of two or more isoprene units. In particular, terpenes comprise two, sesquiterpenes three, and diterpenes four isoprene units, respectively. Higher-order terpene compounds contain more isoprene units. Terpene compounds also may be in alcohol and aldehyde form.

Examples of terpene compounds include, but are not limited to, terpenes and terpineols, such as limonene, terpineol, myrcene, the pinenes, and geraniol; sesquiterpenes, such as the farnesenes, farnesol, the bergamotenes, the bisabolenes, bourbonene, cadinene, copaene, cubebene, elemene, germacrene, santalene, and caryophyllene; sesquiterpene alcohols, including the caryophyllene alcohols, cedrol, cubenol, elemeol, beta-eudesmol (selinenol), 10-epi-gamma-eudesmol, globulol, guaiol, isolongifolanol, cis-lanceol, cis-nuciferol, palustrol, patchouli alcohol, the santalols, spathulenol, and widdrol; diterpenes, such as cafestol, kahweol, cembrene, and taxadiene; and higher-order terpenes.

In embodiments of the invention, the concentration of terpene compounds is selected to impart the desired flavor to resultant liquid or beverage. This concentration of terpene compounds is greater than the concentration of terpene compounds typically present when the terpene compound is not solubilized. Typically, beverages having the concentration of terpene compounds up to about 10 ppm are clear or only slightly (unobjectionably) cloudy. Therefore, the terpene compounds concentration at which embodiments of the invention are effective is at least about 10 ppm. Further, maximum concentration of terpene compounds is limited only by the ability to solubilize the terpene compounds and by the concentration that imparts a taste that is not true to the desired taste or that imparts a taste that is not desired. For example, too high a concentration of terpene compounds will impart too much flavor and other adverse flavor characteristics, such as bitterness, for example.

In view of these considerations, the terpene compounds concentration in a beverage of embodiments of the invention is between about 8 ppm and about 200 ppm, typically between about 10 ppm and about 150 ppm, more typically between about 12 ppm and about 100 ppm, and most typically between about 15 ppm and about 75 ppm.

The concentration of terpene compounds in a beverage is directly related to the flavor profile to be produced in the beverage. Often, the concentration of terpene compounds is selected to mimic the concentration of compounds in a natural product. Thus, with the guidance provided herein, the skilled practitioner will be able to identify the concentration of terpene compounds in the product.

In embodiments of the invention, flavor compounds that are more polar than terpene compounds are added to flavor composition, or to liquid or beverage, to help solubilize the terpene. More polar flavor compounds are any flavor compounds that are more polar than the terpene compounds, and typically is selected so that flavor of the more polar flavor compounds is not perceived by the consumer, or at least is not objectionable to the consumer. More polar flavor compounds can be selected to be complementary to the desired flavor of the liquid.

More polar flavor compounds include, but are not limited to, terpene alcohols, such as linalool and the terpineols; sesquiterpene aldehydes, such as decanal, octanal, and citral; sesquiterpene ketones, such as nookatone, and terpenoid acetates, such as neryl acetate and geranyl acetate. In the flavor industry, more polar compounds are often called "oxygenates" due to the presence of oxygen (or nitrogen) and possess greater polar character than terpenes. The family of oxygenates includes but it not limited to acids, esters, alcohols, aldehydes, ketones, lactones, and lactams.

Embodiments of the invention are directed to addition of at least one compound selected for the terpene compounds and at least one compound selected from the more polar flavor compounds. When more than one terpene compound is added, one or more than one flavor compounds may be used. If in this circumstance more than one flavor compound is used, at least one flavor compound must be more polar than at least one terpene compound, but not all flavor compounds must be more polar than the most polar terpene compound.

In embodiments of the invention, the concentration of more polar flavor compounds is sufficient to solubilize terpene compounds, but not so much as to adversely affect the flavor of the resultant liquid or beverage. Thus, the concentration of more polar flavor compounds is between about 0.3 percent and about 100 percent, typically between about 0.5 percent and about 75 percent, more typically between about 0.8 percent and about 60 percent, and most typically between about 1 percent and about 50 percent, based on the concentration of the terpene compounds solubilized.

The more polar flavor compounds identified have differing polarities. Thus, the exact minimum and maximum concentrations of more polar flavor compounds necessary to solubilize terpene compounds will be different. These concentrations depend not only upon the polarity of the more polar flavor compounds, but also on the polarity of the terpene compounds. For example, to solubilize limonene with citral, the citral concentration would be between about 8 percent and about 50 percent of the limonene concentration. With the guidance provided herein, the skilled practitioner will be able to determine concentrations of more polar flavor compounds suitably used in embodiments of the invention.

One indicator of a trend toward increasing polarity of both more polar flavor compounds and of terpene compounds is the number of oxygen molecules in the compound. Generally, the greater the number of oxygen molecules in a compound, the more polar the compound will be. Thus, oxygenated compounds such as alcohols, ketones, and esters, are more polar than the unmodified compounds from which each is derived. Therefore, the skilled practitioner recognizes that oxygenated terpene compounds are more polar than terpene compounds that are not oxygenated.

Further, in embodiments of the invention, the concentration of more polar flavor compounds mixed with terpene compounds is selected to be sufficient to solubilize the terpene compounds, but insufficient to impart an undesired taste to a resultant liquid or beverage that incorporates the solubilized terpene compounds. As described herein, the concentration of more polar flavor compounds required depends upon properties and characteristics of both the more polar flavor compounds and of the terpene compounds, including the difference in polarities.

In embodiments of the invention, the polarity and flavor of the more polar flavor compounds and of the terpene compounds are balanced to provide the desired flavor profile while providing a beverage of the desired clarity. For example, less of a selected more polar flavor compound will be needed to solubilize a sesquiterpene alcohol than will be required to solubilize the same concentration of the sesquiterpene itself. With the guidance provided herein, the skilled practitioner will be able to select a suitable concentration of more polar flavor compounds.

The skilled practitioner recognizes that the terpene compounds may be introduced as part of an essential oil, and that the essential oil also may contain more polar flavor compounds. Thus, more polar flavor compounds may be introduced coincidentally with terpene compounds. For example, lemon oil contains both limonene and linalool. However, in embodiments of the invention, more polar flavor compounds are added to obtain a concentration higher than that coincidentally present with the terpene compounds. In this way, embodiments of the invention can achieve concentrations of terpene compounds sufficient to provide the desired 'true-to-the-fruit' flavor. Addition of more polar flavor compounds that also occurs co-incident with the terpene compounds in a flavor, such as a flavor essence, may enhance the flavor perceived by the consumer. With the guidance provided herein, the skilled practitioner will be able to identify suitable combinations of terpene compounds and more polar flavor compounds.

Typically, solubilized terpene compounds are introduced to liquid as part of a microemulsion with a surfactant. A microemulsion is a thermodynamically stable, transparent, low viscosity, isotropic dispersion comprising oil and water stabilized by a surfactant. A microemulsion optionally contains a co-surfactant or co-solvent. Suitable co-solvents are mono- and poly-hydric compounds, typically water soluble monohydric food grade alcohol, and more typically ethanol, which alcohol is used as the food-grade alcohol. Propylene glycol and common mono- and disaccharide sugars also commonly are used in this context.

Microemulsions typically have particle sizes ranging from about 5 nm to about 100 nm. Although the inventors do not wish to be bound by theory, it is believed that microemulsions arise from a spontaneous self-assembly of the hydrophobic and hydrophilic parts of surfactant molecules with the other compounds. Microemulsions also can exist in the presence of excess water phase.

Microemulsions typically are prepared by first making a microemulsion precursor, or concentrate, by blending an oil phase (hydrophobic phase) with a surfactant prior to adding co-solvent. This precursor or concentrate from microemulsion micelles upon dilution with water. The proper ratio of surfactant to oil phase to co-solvent to water must be achieved and maintained to yield thermodynamically stable microemulsions. Order of addition can be varied according to the physical chemical properties of the oil phase, surfactant and co-solvent selected.

Embodiments of the invention include a fluid flavor composition in the form of a precursor to the microemulsion. Microemulsion precursor flavor composition embodiments of the invention comprise terpene compounds, more polar flavor compounds, and surfactant. A co-solvent can be included in the precursor flavor composition embodiments of the invention, as can a small quantity of water. When flavor composition is added to an aqueous composition, such as a beverage, the microemulsion is formed in the beverage.

Polysorbate typically is used as the surfactant in embodiments of the invention. Polysorbate is a commonly known non-ionic surfactant often used in foods. Polysorbate is derived from polyethoxylated sorbitan and a fatty acid, as set forth in the following table. Polysorbate is commonly available in six grades as polysorbate 20, 40, 60, 65, 80, and 85, commercially available from suppliers. These products also are available from ICI Americas as Tween 20, 40, 60, 65, 80, and 85. The chemical formulas and HLB values of these compounds are as follows:

| Name | Formula | HLB |
| --- | --- | --- |
| Polysorbate 20 | Polyoxyethylene (20) sorbitan monolaurate | 16.7 |
| Polysorbate 40 | Polyoxyethylene (20) sorbitan palmitate | 15.6 |
| Polysorbate 60 | Polyoxyethylene (20) sorbitan stearate | 14.9 |
| Polysorbate 65 | Polyoxyethylene (20) sorbitan tri-stearate | 10.5 |
| Polysorbate 80 | Polyoxyethylene (20) sorbitan oleate | 15.0 |
| Polysorbate 85 | Polyoxyethylene (20) sorbitan trioleate | 11.0 |

Polysorbate is reasonably soluble in water, and so can conveniently be dissolved in aqueous solutions. However, more typically, polysorbate is added to the oil phase first, typically to form the precursor embodiments of the invention.

Polysorbate typically is used as the surfactant to form a microemulsion in accordance with embodiments of the invention. Polysorbate is food-safe and well-accepted in liquids. However, other food-safe surfactants also can be used. Other suitable surfactants include, but are not limited to, sorbitan monolaurate (Span 20), sorbitan monopalmitate (Span 40), sorbitan monostearate (Span 60), sorbitan monooleate (Span 80), sucrose monomyristate, sucrose palmitate/stearate, sucrose monopalmitate, sucrose stearate, vitamin E including TPGS (tocopherol propylene glycol succinate, a water-soluble form of vitamin E), saponins, especially the tri-terpenoid forms, dioctylsulfosuccinate sodium salt (DOSS), monoglyceride monooleate, monoglyceride monolaurate, monoglyceride monopalmitate, lecithin, diglyceride mixtures, citric acid esters of monoglycerides, acetic acid esters of monoglycerides, lactic acid esters of monoglycerides, diacetyl tartaric esters of monoglycerides, polyglycerol esters of fatty acids such as decaglycerol monocaprylate/caprate, triglycerol monooleate, decaglycerol monostearate, decaglycerol dipalmitate, decaglycerol monooleate, decaglycerol tetraoleate and hexaglycerol dioleate, α-, β-, and γ-cyclodextrins, propylene glycol esters of fatty acids such as dicaprate esters, mono and dicaprylate ester blends and diesters of caprylate and capric acids, stearoyl lactylates, free fatty acids (typically $C_{8-18}$), and combinations thereof.

The skilled practitioner recognizes that the concentration of surfactant typically is limited by governmental regulation, taste, and beverage processing considerations, such as foaming. Potential suitable surfactants have different maximum suitable concentrations. These concentrations are related to these and other considerations. It is these limitations of surfactants that limit the available concentrations of terpene compounds in beverages, especially in clear beverages. In accordance with embodiments of the invention, clear beverages having an acceptable surfactant concentration and the concentration of terpene compounds higher than the terpene compounds concentration available without the more polar flavor compounds.

Embodiments of the invention are different from simple use of surfactant as an intermediate between two otherwise immiscible compounds. Rather, embodiments of the invention utilize more polar flavor compounds to increase the concentration of terpene compounds by solubilizing the terpene compounds in a system comprising a surfactant. Precursor embodiments of the invention then can be introduced to liquid or beverage to form a microemulsion, or the microemulsion can be formed in place by combination of the necessary ingredients.

EXAMPLES

The following examples are not intended to limit the invention. Rather, they are intended to illustrate the effectiveness of the invention.

Example 1

The ability to solubilize limonene, a terpene, in the presence of ethanol and polysorbate 60 surfactant, to form a clear beverage obtained from a beverage concentrate by diluting the concentrate with 5 volumes of water, was determined.

Three component microemulsion precursor compositions (limonene, polysorbate 60, and ethanol) were prepared, and then added to a beverage concentrate. Ethanol was used as the co-solvent. The ratio of limonene to ethanol was 1:2 in each test. Ratios of limonene to surfactant were 1:1, 1:2, and 1:3. The beverage concentrate was prepared in accordance with an ordinary manufacturing process, and then left to sit overnight before the concentrate was diluted to form a beverage.

Three series of concentrates, and of beverages made therefrom after an overnight storage period, were made, one at each limonene/surfactant ratio. The concentration of limonene in beverage was increased from 20 ppm to 140 ppm in 20 ppm increments, although not every increment was manufactured. At 1:1 limonene:surfactant, the 20 ppm beverage was slightly hazy, but a plot of the results predicted that a concentration less than 15 ppm would be clear. The only concentrate that was clear was the 1:3 limonene:surfactant concentrate at 20 ppm limonene. The following table summarizes the maximum concentrations of limonene in beverage that yielded a clear beverage, i.e., a beverage that had an NTU (Hach) value less than 2.5.

| Ratio | 100% Limonene, ppm |
|---|---|
| 1:1 | <15 |
| 1:2 | 40 |
| 1:3 | 75 |

Thus, it is clear that surfactant alone will increase the concentration of limonene in a clear beverage. However, use of more polar flavor compounds in accordance with embodiments of the invention and use of polar compounds that mimic more polar flavor compounds yield a greater increase, as illustrated in the following examples.

Example 2

The method of Example 1 was followed to make three series of beverage concentrates for each of the four mixtures described below, rather than for 100 percent limonene. Ethyl acetate and citral were used as model polar compounds, or polar compounds proxies, for the sake of demonstrating the invention.

Mixture A—5 percent ethyl acetate (a substitution for a more polar flavor compound of embodiments of the invention) and 95 percent limonene;

Mixture B—30 percent citral and 70 percent limonene;

Mixture C—30 percent ethyl acetate and 70 percent limonene; and

Mixture D—5 percent citral and 95 percent limonene.

Beverages were made from concentrates by diluting concentrate after an overnight storage period. Again, not every interval was manufactured.

The following table indicates the maximum beverage limonene concentration that yields a clear beverage. The "100% limonene" results from Example 1 are repeated for ease of comparison.

| Ratio | Limonene, ppm | Mixture A, ppm | Mixture B, ppm | Mixture C, ppm | Mixture D, ppm |
|---|---|---|---|---|---|
| 1:1 | <15 | <15 | 51 | 22 | 18 |
| 1:2 | 40 | ≈30 | 80 | 63 | 32 |
| 1:3 | 75 | ≈45 | 120 | 120 | 70 |

Both Mixture B and Mixture C were still very clear at 120 ppm limonene concentration. For example, after 24 hours, both mixtures at 1:3 limonene:surfactant had an NTU of 0.43. This suggests that the maximum limonene concentration in a clear beverage may be significantly higher than 120 ppm. Indeed, it appears that higher concentrations can exist in clear beverages. However, the user would have to consider whether the flavor of such a beverage is acceptable to consumers.

However, neither Mixture A nor mixture D, both of which illustrate addition of 5 percent more polar flavor compounds or substitute therefore, based on the total weight of the limonene and more polar flavor compounds (about 5.25 percent more polar flavor compounds based on the weight of the limonene), was effective at increasing the solubility of limonene at any condition.

Thus, as can be seen, at sufficient (42.2 percent) concentration, a more polar flavor compound (citral) was effective at solubilizing terpene compound (limonene) to yield a clear beverage having a higher concentration of limonene than is possible with limonene alone. However, citral at about 5 percent was not sufficient to increase the solubility of the limonene.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, various types of beverages sweetened with various sweeteners and having various flavors can benefit from embodiments of the invention. Also, flavor compositions comprising both more polar flavor compounds and terpene compounds are contemplated and described herein, but are not exemplified.

We claim:

1. A method for increasing the concentration of a terpene compound in liquid comprising:

adding a flavor compound more polar than the terpene compound to the terpene compound to solubilize the terpene compound and forming a microemulsion in a beverage in the presence of a surfactant;

wherein the flavor compound is selected from the group consisting of terpene alcohols, sesquiterpene aldehydes, sesquiterpene ketones, terpenoid acetates, and blends thereof;

and wherein the concentration of the more polar flavor compound is between about 0.8 percent and about 60 percent, based on the concentration of the terpene compound solubilized.

2. The method of claim 1 wherein the terpene compound is selected from the group consisting of terpenes, sesquiterpenes, diterpenes, higher-order terpenes, and blends thereof.

3. The method of claim 2 wherein the terpene compound concentration is between about 8 ppm and about 200 ppm.

4. The method of claim 1, further comprising adding a sweetener.

5. The method of claim 3 wherein the terpene compound concentration is between about 15 ppm and about 75 ppm.

6. A liquid comprising a terpene compound and a flavor compound, wherein the flavor compound is more polar than the terpene compound and is added to solubilize the terpene compound, the more polar flavor compound being present in a concentration higher than the concentration provided by any amount of the more polar flavor compound coincidentally present with the terpene compound, and the liquid having a terpene compound concentration that is higher than the terpene compound concentration that can be achieved without the added more polar flavor compound, wherein the flavor compound is selected from the group consisting of terpene alcohols, sesquiterpene aldehydes, sesquiterpene ketones, terpenoid acetates, and blends thereof, and wherein the concentration of the more polar flavor compound is between about 0.8 percent and about 60 percent, based on the concentration of the terpene compound solubilized.

7. The liquid of claim 6 wherein the terpene compound is selected from the group consisting of terpenes, sesquiterpenes, diterpenes, higher-order terpenes, and blends thereof.

8. The liquid of claim 7 wherein the terpene compound concentration is between about 8 ppm and about 200 ppm.

9. The liquid of claim 6, further comprising a sweetener.

10. The liquid of claim 8 wherein the terpene compound concentration is between about 15 ppm and about 75 ppm.

11. A liquid microemulsion precursor composition comprising a terpene compound, a flavor compound that is more polar than the terpene compound and is added to solubilize the terpene compound, and a surfactant, wherein the more polar flavor compound is selected from the group consisting of terpene alcohols, sesquiterpene aldehydes, sesquiterpene ketones, terpenoid acetates, and blends thereof, and wherein the concentration of the more polar flavor compound is between about 0.8 percent and about 60 percent, based on the concentration of the terpene compound solubilized.

12. The precursor composition of claim 11 wherein the terpene compound is selected from the group consisting of terpenes, sesquiterpenes, diterpenes, higher-order terpenes, and blends thereof.

13. The precursor composition of claim 12 wherein the terpene compound concentration is between about 8 ppm and about 200 ppm.

14. The precursor composition of claim 11, further comprising a sweetener.

15. The precursor composition of claim 13 wherein the terpene compound concentration is between about 15 ppm and about 75 ppm.

16. A beverage comprising a microemulsion comprising a terpene compound and a flavor compound, wherein the flavor compound is more polar than the terpene compound and is added to solubilize the terpene compound, wherein the more polar flavor compound is selected from the group consisting of terpene alcohols, sesquiterpene aldehydes, sesquiterpene ketones, terpenoid acetates, and blends thereof, and wherein the concentration of the more polar flavor compound is between about 0.8 percent and about 60 percent, based on the concentration of the terpene compound solubilized.

17. The beverage of claim 16 wherein the terpene compound is selected from the group consisting of terpenes, sesquiterpenes, diterpenes, higher-order terpenes, and blends thereof.

18. The beverage of claim 17 wherein the terpene compound concentration is between about 8 ppm and about 200 ppm.

19. The beverage of claim 16, further comprising a sweetener.

20. The beverage of claim 18 wherein the terpene compound concentration is between about 15 ppm and about 75 ppm.

\* \* \* \* \*